United States Patent [19]
McKinnon

[11] Patent Number: 5,333,750
[45] Date of Patent: Aug. 2, 1994

[54] DURABLE LIGHTWEIGHT METER BOX

[76] Inventor: Robert M. McKinnon, P.O. Box 648, Bedford, Tex. 76021-0648

[21] Appl. No.: 126,237

[22] Filed: Sep. 24, 1993

[51] Int. Cl.$^5$ .............................................. B65D 6/38
[52] U.S. Cl. .................................... 220/484; 220/675; 220/673
[58] Field of Search ................ 137/364, 363; 220/484, 220/675, 670, 671, 672, 673, 469, 425, 3.2, 3.3

[56] References Cited

U.S. PATENT DOCUMENTS

| | | | |
|---|---|---|---|
| 1,702,296 | 2/1929 | Flink | 220/484 |
| 3,952,908 | 4/1976 | Carson | 220/484 |
| 4,065,020 | 12/1977 | Carson | 220/484 |
| 4,163,503 | 8/1979 | McKinnon | 220/484 |
| 4,231,482 | 11/1980 | Bogan | 220/675 |
| 4,848,605 | 7/1989 | Wise | 220/675 |
| 4,872,575 | 10/1989 | Kobilan | 220/484 |
| 5,249,697 | 10/1993 | McKinnon | 220/484 |

Primary Examiner—S. Castellano
Attorney, Agent, or Firm—Arthur F. Zobal

[57] ABSTRACT

The meter box has an inside wall defining a cavity and having upper and lower ends, with upper and lower openings respectively leading to the cavity whereby the cavity may receive a meter by way of the lower opening. An outside wall having upper and lower ends is spaced from and surrounds the inside wall. A receptacle wall is coupled between the upper ends of the inside and outside walls for receiving and supporting a cover. A flange is coupled to and surrounds the outside wall between the upper and lower ends of the outside wall. The flange has an upper flange wall coupled to the outside wall and a lower flange wall spaced from the upper flange wall. The outside wall has alternate inner and outer wall sections spaced from each other and having upper and intermediate ends respectively. The lower flange wall is coupled to the intermediate ends of the outside wall sections of the outside wall. The inner wall sections extend above the flange with their upper ends located below and next to the receptacle wall for providing support for the receptacle wall. Support wall sections are coupled to the lower flange wall and to the upper ends of the inner sections for providing support for the receptacle.

4 Claims, 5 Drawing Sheets

DURABLE LIGHTWEIGHT METER BOX

BACKGROUND OF THE INVENTION

1. Field of the Invention

The present invention relates to meter boxes for protecting meters, in particular, water meter boxes for water meters.

2. Description of the Prior Art

Meter boxes are used to protect buried meters while simultaneously providing easy access to the meters for meter reading and repair. Meters located in roadways and driveways require meter boxes capable of withstanding heavy loads that may be placed on the cover of the meter box by vehicles.

Concrete meter boxes are commonly used in roadways and driveways since they are heavy duty and are capable of withstanding heavy loads placed on the cover of the meter box. Concrete meter boxes are formed by a wall of concrete that extends about the meter. A lip extends about the top of the meter box. The cover of the meter box fits into the top of the meter box and rests on the lip. The concrete lip provides sufficient support to the cover to enable the meter box to withstand the force of heavy loads on the cover.

Concrete meter boxes present some disadvantages, however. Concrete meter boxes are difficult to transport and install. During transport, concrete meter boxes are prone to being chipped, and significant amounts of concrete meter boxes become non-usable because of damage incurred in transport. Installation of concrete meter boxes is difficult because of the weight of the meter boxes. Installation of a concrete meter box generally requires the effort of two people because the meter boxes weigh about seventy pounds each. The weight of the concrete meter boxes also presents some danger of physical injury to the persons installing the meter box.

SUMMARY OF THE INVENTION

An object of the present invention is to provide a durable, lightweight meter box capable of being located in roadways or driveways and being capable of withstanding heavy loads that may be placed on the cover of the meter box.

In accordance with the invention, there is provided an apparatus for receiving a meter and for supporting a cover. The apparatus comprises an inside wall defining a cavity and having upper and lower ends, with upper and lower openings respectively leading to the cavity whereby the cavity may receive a meter by way of the lower opening. An outside wall having upper and lower ends is spaced from and surrounds the inside wall. A receptacle wall is coupled between the upper ends of the inside and outside walls for receiving and supporting a cover. The outer wall has alternate inner and outer sections spaced from each other. The outer sections have intermediate ends located between the upper and lower ends of the outside wall. The inner wall sections have upper ends located below and next to the receptacle wall for providing support for the receptacle wall. Support wall sections are coupled to the intermediate ends of the outside wall and to the upper ends of the inner wall sections for providing support for the receptacle wall.

In accordance with a further aspect of the invention, a flange is coupled to and surrounds the outside wall between the upper and lower ends of the outside wall. The flange has an upper flange wall coupled to the outside wall and a lower flange wall spaced from the upper flange wall and coupled to the intermediate ends of the outer wall sections of the outside wall and to the support wall sections.

In another aspect, the outside wall comprises side wall sections coupled to the inner and outer wall sections and to the support wall sections. The outside wall above the flange is a smooth continuous wall extending around the inside wall.

In the preferred embodiment, the inside and outside walls, the support wall sections and the receptacle wall are formed of plastic material.

DESCRIPTION OF THE PREFERRED EMBODIMENTS

Figure 1:
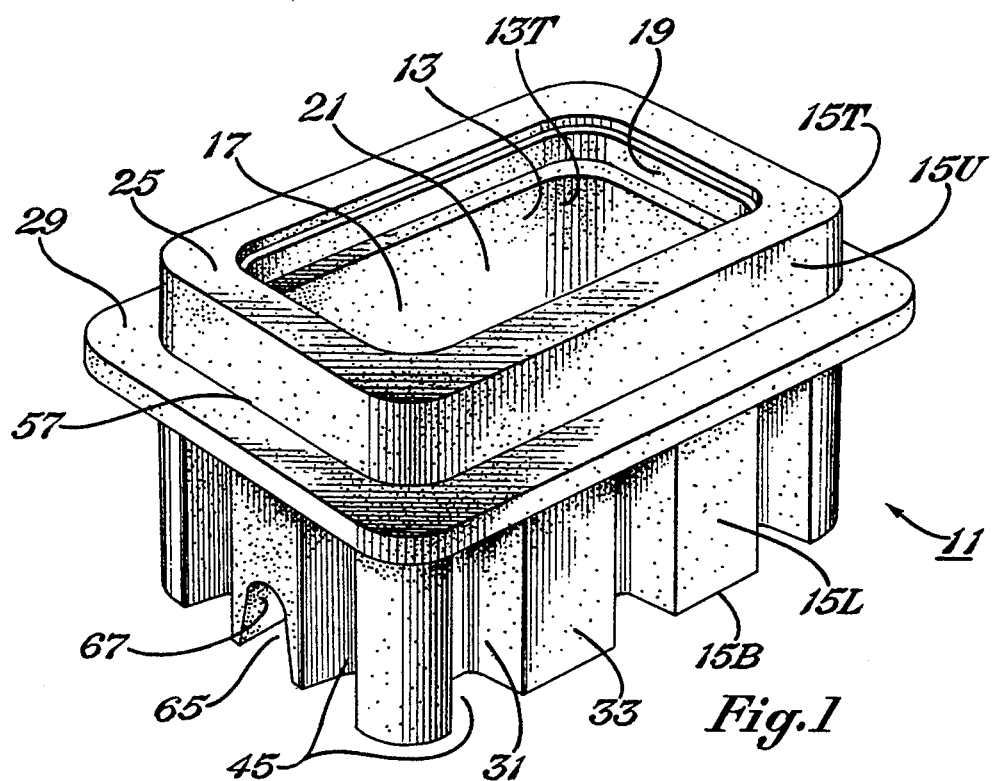
FIG. 1 is a perspective view of the meter box of the invention.
Figure 2:
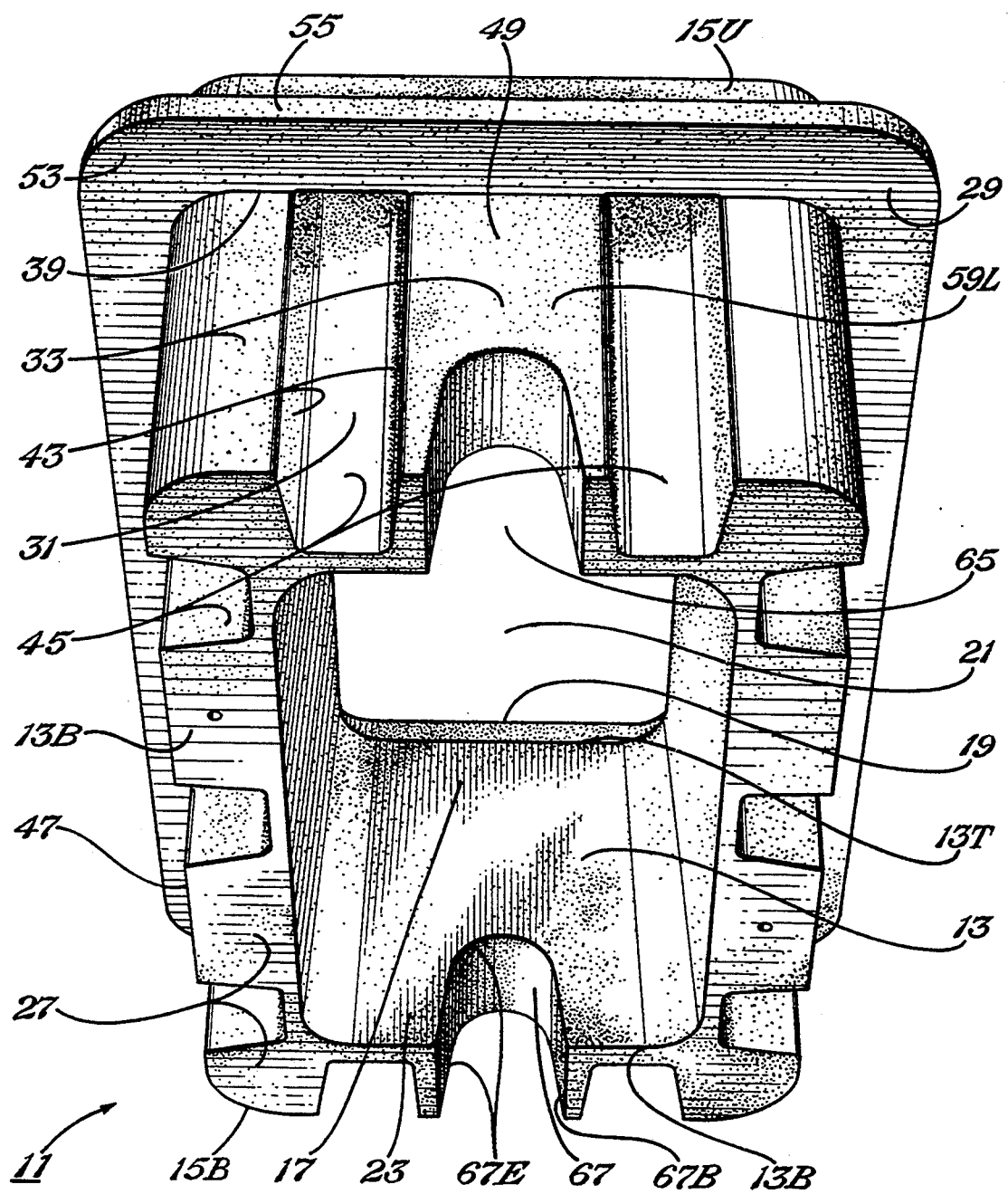
FIG. 2 is a perspective view from the bottom of the meter box.

Referring now to FIGS. 1 and 2, the meter box of the invention shown is identified by reference numeral 11. The meter box 11 has in inner wall 13 and an outer wall 15 formed of lower and upper portion 15L and 15U, where the outer wall 15 is located about the inner wall 13. The inner wall 13 encompasses a cavity 17 in which a meter may be located. A cover receptacle 19 extends about the top 13T of the inner wall for receiving a cover (not shown) which may be of metal or plastic. The receptacle 19 is formed by wall sections 35, 37, 39, and 41. A top opening 21 extends through the cover receptacle 19 and the top 13T of the inner wall and communicates with the cavity 17 so that a meter located in the meter box 11 may be viewed through the top opening 21 when the cover is removed. A bottom opening 23 extends through the bottom end 13B of the inner wall 13 and communicates with the cavity 17 so that a meter may be received through the opening 23 and located in the cavity 17 by placing the meter box 11 over and around the meter.

The inner wall 13 and cover receptacle 19 are coupled to the outer wall 15. A top wall 25 extends between and is coupled to the top end 15T of the outer wall 15 and the top end 19T of the cover receptacle 19. A bottom wall 27 extends between and is coupled to the inner wall 13 and the outer wall 15 at the bottom ends 13B and 15B of the inner wall 13 and the outer wall 15. A double wall flange 29 extends about and is coupled to the outer wall 15, dividing the outer wall 15 into the upper and lower portions 15U, 15L. The flange 29 prevents the meter box 11 from moving upwards and downwards relative to a meter located in the meter box 11 when the meter box 11 is placed in the ground about a meter. Dirt below the flange 29 prevents the box from sinking and dirt located above the flange prevents the box from rising.

The meter box 11 is structured to provide support to the cover receptacle 19 so the cover receptacle 19 will support heavy loads that may be placed on a cover located on the meter box 11. The lower portion of the outer wall 15L has inner and outer sections 31 and 33 which are coupled together by side sections 43. The inner sections 31 extend upwards inwardly of the upper portion of the outer wall 15U to a location directly beneath section 39 of the cover receptacle 19. Receptacle support walls 61 extend at an angle from the lower end 29L of the flange 29 and from the upper or intermediate ends 33(I) of the outer sections 33 upward and inward and are coupled to the top ends 31T of each inner section 31 directly beneath the wall section 39 of cover receptacle 19 thereby forming support edges 63 for the wall sections 39 of the receptacle. The support edges 63, receptacle support walls 61, and inner sections and outer sections 31 and 33 of the outer wall 15L provide support to the cover receptacle 19.

Figure 3:
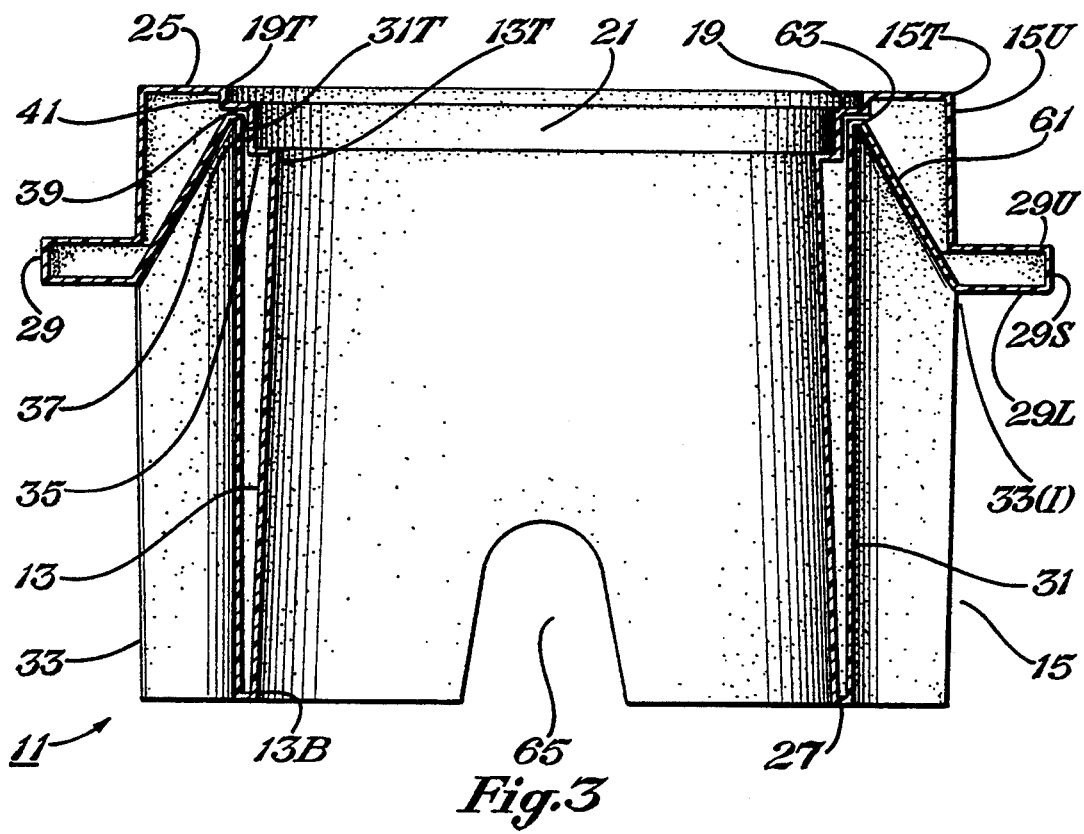
FIG. 3 is a cross-sectional view of FIG. 5 taken along line III—III thereof.

The interior of the meter box is formed by the inner wall 13 and the cover receptacle 19. The inner wall and the cover receptacle 19 extend continuously about the cavity 17. In cross-section the inner wall 13 and cover receptacle 19 extend about the cavity 17 in a round-cornered rectangular shape. As shown in FIG. 3, the inner wall 13 extends upward from the bottom wall 27 of the meter box 11 to the cover receptacle 19. The cover receptacle 19 extends from the top 13T of the inner wall 13 upward and outward to the top wall 25 of the meter box 11.

Figure 7:
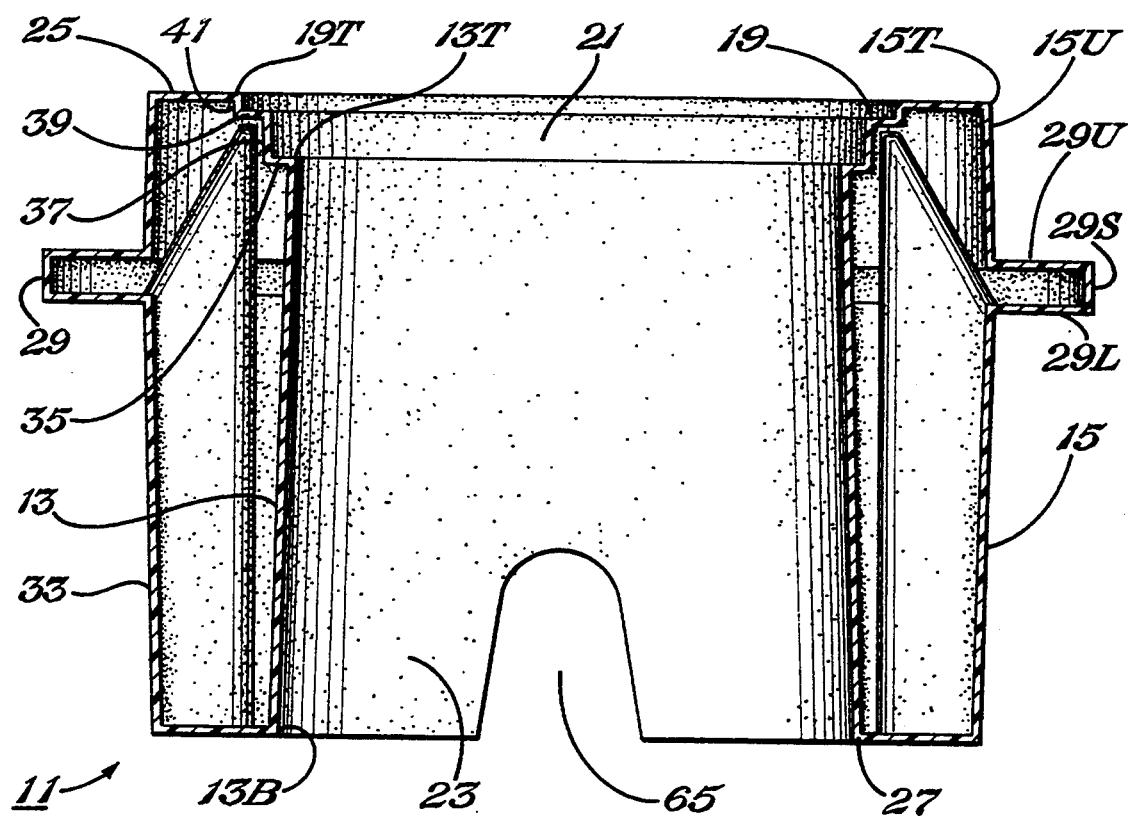
FIG. 7 is a cross-section of FIG. 5 taken along lines VII—VII thereof.

Referring again to FIG. 3 and to FIG. 7, the cover receptacle 19 is a stepped wall shaped to receive a meter box cover. The cover receptacle 19 has a base support section 35 which is integrally coupled to the top 13T of the inner wall 13 and extends transverse of the inner wall 13 outward from the inner wall 13. The base support section 35 receives and supports the base of a cover for the meter box 11. A base guide section 37 of the cover receptacle 19 is integrally coupled to the base support section 35 and extends upward from the base support section 35 transverse to the base support section 35. A cover support section 39 of the cover receptacle 19 integrally is coupled to the base guide section 37 and extends transversely outward from the base guide section 37. The cover support section 39 receives and supports the cover portion of a meter box cover. A cover guide section 41 extends upwards transversely between the cover support section 39 and the top wall 25. The cover guide section 39 is integrally coupled to the cover support section 39 and to the top wall 25. The cross-section of the edges of the cover have the shape of wall sections 35, 37, 39, and 41 of the receptacle as shown in FIGS. 3 and 7.

The exterior of the meter box 11 is formed by the outer wall 15 and the flange 29. The flange 29 divides the outer wall 15 into upper and lower portions 15U, 15L. The upper portion 15U of the outer wall 15 extends continuously about the cover receptacle 19 and the inner wall 13. In cross-section, the upper portion 15U of the outer wall 15 has a round-cornered rectangular shape. The upper portion 15U of the outer wall 15 extends between the top wall 25 and the flange 29.

Figure 4:
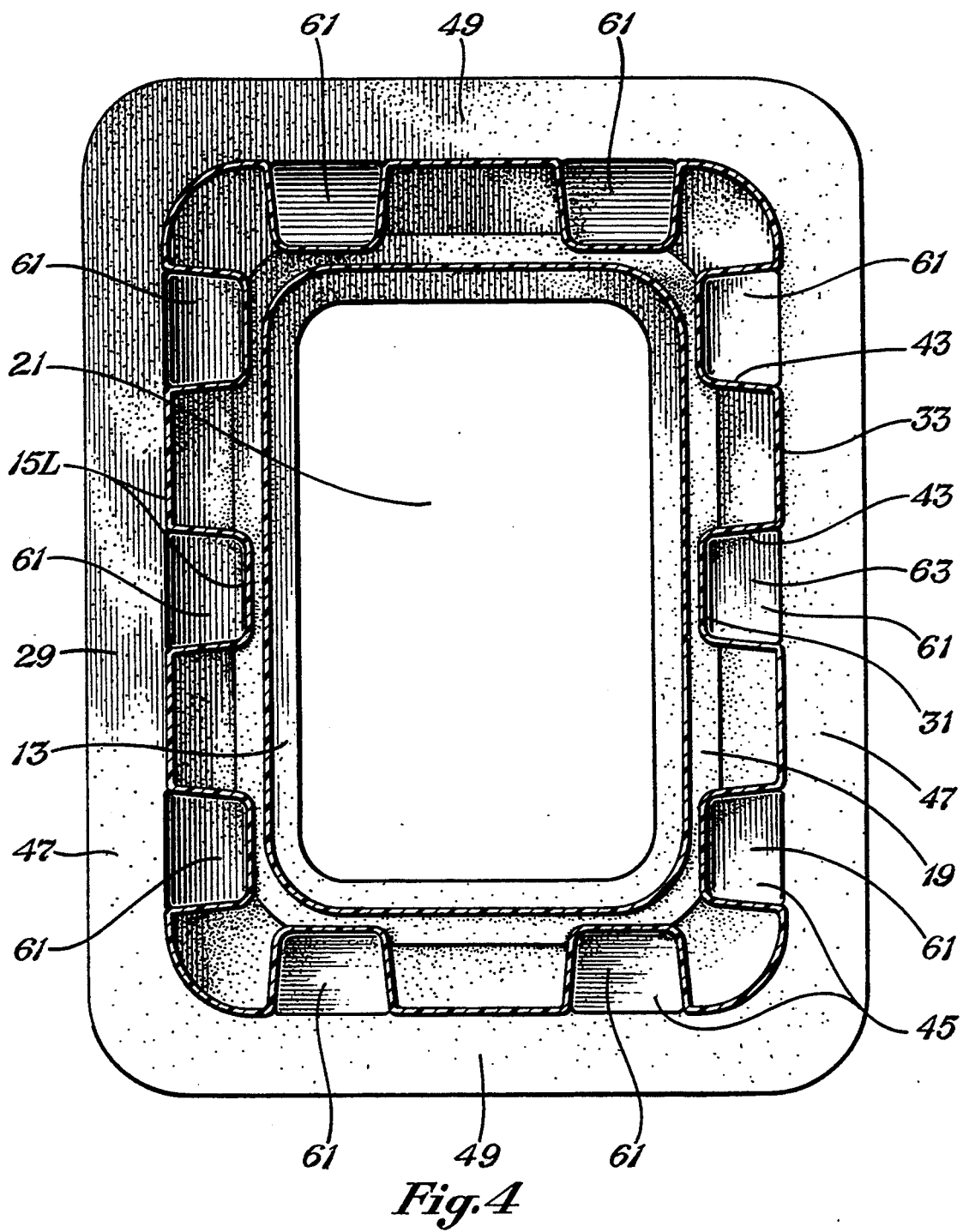
FIG. 4 is a cross-sectional view of FIG. 5 taken along line IV—IV thereof.
Figure 5:
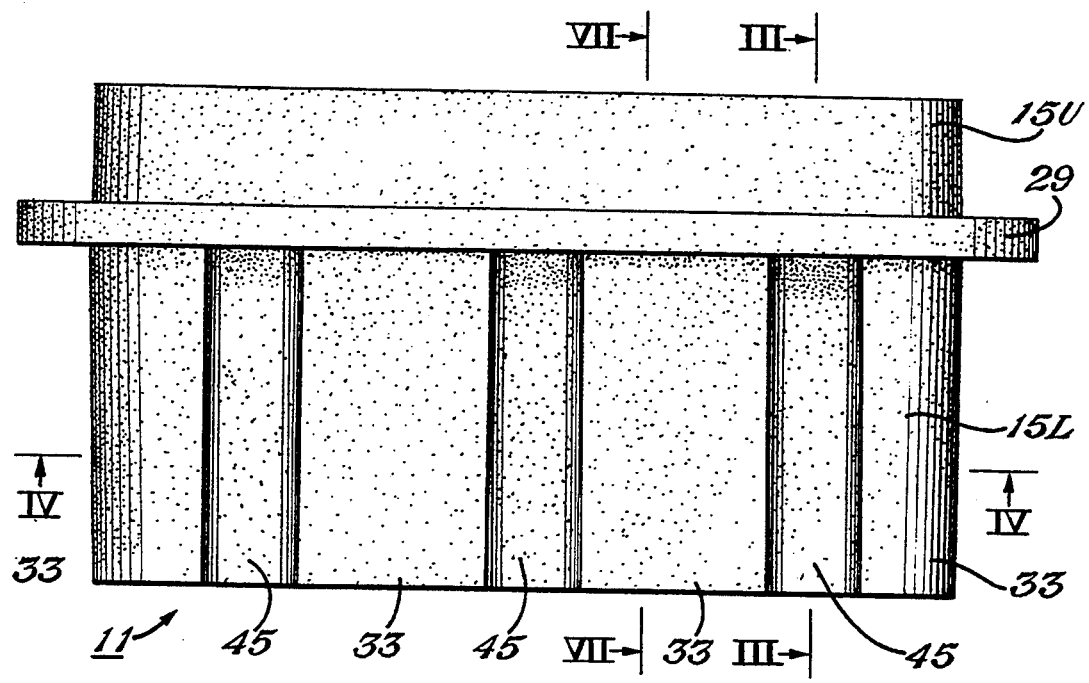
FIG. 5 is a side view of the meter box.
Figure 6:
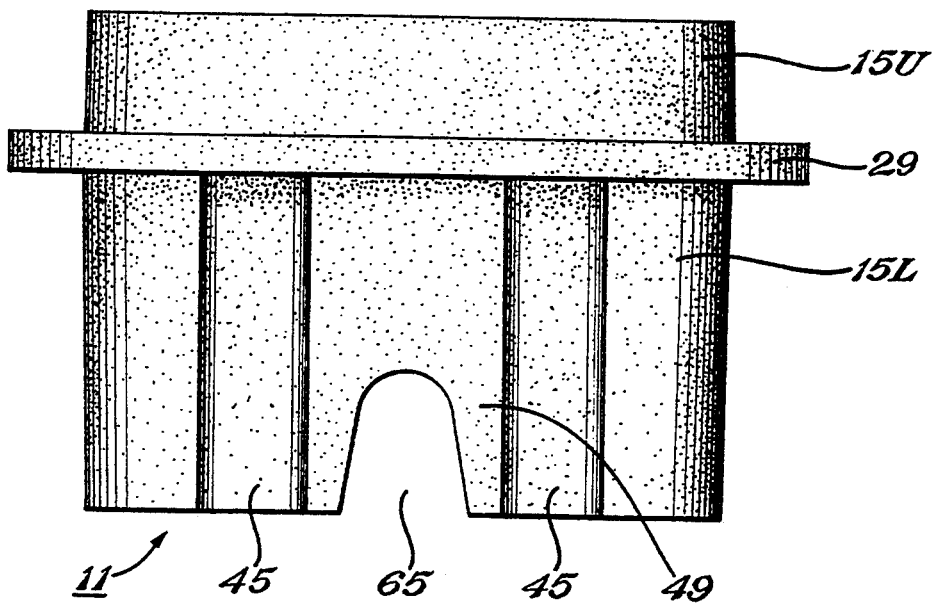
FIG. 6 is an end view of the meter box.

As shown in FIG. 4, the lower portion 15L of the outer wall 15 extends continuously about the inner wall 13. The lower portion 15L of the outer wall 15 has alternating inner and outer sections 31, 33 integrally coupled together by side sections 43 that extend transversely between the inner and outer sections 31, 33. The inner sections 31 extend upward from the bottom wall 27 adjacent the inner wall 13, while the outer sections 33 extend upwards from the bottom wall 27 substantially in the same plane as that of the upper portion 15U of the outer wall 15. The inner sections, outer sections and side sections 31, 33, 43 are integrally coupled to the bottom wall 27 at the bottom of the meter box 11. The coupled inner and side sections 31, 43 form slots 45 that extend between the outer sections 33 of the lower portion 15U of the outer wall 15. Referring to FIGS. 4, 5 and 6, each side 47 of the box 11 has three slots 45 located between the outer sections 33, and each end 49 of the box 11 has two slots 45 located between the outer sections 33. Referring to FIGS. 1, 3, the flange 29 extends about the outer wall 15 and is coupled to the lower and upper sections 15L, 15U of the outer wall 15. The flange 29 is formed by upper and lower flange walls 29U and 29L integrally coupled to a side wall 29S that extends transversely between the upper and lower flange walls 29U, 29L. The upper flange wall 29U integrally is coupled to the lower end of the upper portion 15U of the outer wall 15 and extends transversely outward from the outer wall 15. The lower flange wall 53 is integrally coupled to the upper or intermediate ends of the outer sections 33 of the lower portion 15L of the outer wall 15, and is integrally coupled to the lower ends of the support walls 61 along the slots 45 of the outer wall 15.

As shown in FIG. 3, the inner section 31 and side sections 43 of each slot 45 and a corresponding receptacle support wall 61 form a support structure for supporting the cover receptacle 19. The inner section 31 of a slot 45 extends upwards adjacent the inner wall 13 from the bottom wall 27 and is integrally coupled to a support edge 63 located directly beneath the cover support section 39 of the cover receptacle 19. The receptacle support wall 61 extends from the lower flange wall 29L, angling upward and inward, and is coupled to the support edge 63 beneath the cover support section 39 of the cover receptacle 19. The support edge 63 is coupled to the upper edges of the inner section 31 and the receptacle support wall 61. The support edge 63 is spaced from the support section 39 about 1/16 of an inch and the upper end of the inner section 31 is spaced from the guide section 37 about 1/16 of an inch. The side sections 43 of each slot 45 are integrally coupled to the inner section 31 of the slot 45 and to the corresponding receptacle support wall 61 as the inner section 31 extends upward from the flange 29.

The support structures formed by each inner section 31, corresponding side sections 43, corresponding receptacle support wall 61, support edge 63 and outer section 33 enable the meter box 11 to withstand large forces exerted on a cover located on the meter box 11. As force is applied to the cover, the force is transmitted through the cover to the cover support section 39 of the cover receptacle 19. If the force is great enough, the cover support section 39 is deflected slightly to contact the support edge 63 located beneath the cover support section 39. The inner sections 31 of the lower portion 15L of the outer wall 15, the receptacle support walls 61 and sections 33 and 43 provide resistive force at the support edge 63 preventing further deflection of the cover support section 39 and enabling the cover support section 39 to withstand the applied force. The side sections 43 and outer sections 33 provide structural support to the inner sections 31 and the receptacle support walls 61.

In a preferred embodiment, as shown in FIG. 2, meter pipe apertures 65 are located in the opposing ends 49 of the meter box 11. The pipe apertures 65 have arched shapes and are centrally located at the ends 49 of the meter box 11 at the bottom of the meter box 11. The pipe apertures 65 extend through the inner, outer and bottom walls 13 and 15 of the meter box and have lower walls 67 so that piping may extend through each aperture 65 into the cavity 17 of the meter box 11. The piping may be connected to a meter located within the meter box.

Arched aperture walls 67 extend between the inner and outer walls 13, 15 about the pipe apertures 65. The aperture walls 67 are integrally coupled to the inner and outer walls 13, 15 along the edges 67E of the aperture walls 67. The aperture walls 67 are integrally coupled to the bottom wall 27 about the pipe apertures 65 along bottom edges 67B of the aperture walls 67.

The meter box 11 is formed of a rigid plastic material. In a preferred embodiment the meter box is formed of high density polyethylene by a rotational molding process.

The meter box 11 in one embodiment stands $11\frac{1}{2}$ inches tall, as measured from the bottom wall 27 to the top wall 25 of the box 11. The lower portion 15L of the outer wall 15 extends $7\frac{3}{4}$ inches from the bottom wall 27 to the lower flange wall 29L. The side wall 29S of the flange 29 extends 1 inch from the lower flange wall 29L to the upper flange wall 29U. The upper portion 15U of the outer wall 15 extends $2\frac{3}{4}$ inches from the upper flange wall 29U to the top wall 25.

Along the interior of the box 11, the inner wall 13 extends 10 inches upwards from the bottom wall 27 of the box 11 to the base support section 35. The base guide section 37 extends $1\frac{1}{8}$ inches upward from the base support section 35 to the cover support section 39. The cover guide section 41 extends $\frac{3}{8}$ inches upward from the cover support section 39 to the top wall 25 of the meter box 11.

The meter box 11 is $15\frac{1}{2}$ inches wide as measured across the outer walls 15 at the sides 47 of the box 11.

Along the lower portion 15L of the outer wall 15 the outsides of the inner sections 31 of the lower portion 15L are located 2 inches inward of the outside of the outer sections 33 of the lower portion. The cavity side of the inner wall 13 is located $2\frac{1}{2}$ inches inward of the outside of outer sections 33 of the lower portion 15L of the outer wall 15. The cavity side of the wall 13 is located 7/16 of an inch from the outsides of the inner sections 31. The cavity sides of the inner walls 13 are located $10\frac{1}{2}$ inches apart at the bottom of the box 11 between sides 47. Along the face of the lower portion 15L of the outer wall 15, the slots 45 are 3 inches wide.

Along the upper portion 15U of the outer wall 15, the cavity side of the cover guide section 41 is located 2 inches inward of the outside of the outer wall 15. The cavity side of the cover support section 39 extends $\frac{1}{2}$ inch inward from the cavity side of section 41 to the base guide section 37, the cavity side of which is located $2\frac{1}{2}$ inches inward from the outside of the outer wall 15U. The base support section 35 extends $\frac{1}{2}$ inch inward from the cavity side of section 37 to the inner wall 13, the cavity side of which is located at its upper end 3 inches inward of the outside of outer wall 15U.

The cavity sides of the inner walls 13 between sides 47 are located $9\frac{1}{2}$ inches apart at the top of the meter box 11.

The meter box 11 is $20\frac{1}{2}$ inches long as measured across the outer wall 15 between ends 49 of the box 11. The cavity sides of the inner walls 13 are located $14\frac{1}{2}$ inches apart at the top of the meter box 11, and 15 inches apart at the bottom of the box 11. The pipe apertures 65 are $3\frac{1}{4}$ inches wide at the bottom of the meter box 11 and extend upwards $3\frac{1}{4}$ inches. The upper and lower flange walls 29U and 29L extend 2 inches outward of the outer wall 15 as the flange 29 extends about the outer wall 15.

The meter box is hollow between the inner and outer walls 13 and 15 and upper and lower walls 25 and 27. The flange 29 also is hollow. The thickness of the walls of the meter box is about $\frac{1}{8}$ of an inch.

It is to be understood that the meter box may have other dimensions than those disclosed above.

I claim:

1. An apparatus for receiving a meter and for supporting a cover, comprising:

an inside wall defining a cavity and having upper and lower ends, with upper and lower openings respectively leading to said cavity whereby said cavity may receive a meter by way of said lower opening, an outside wall spaced from and surrounding said inside wall, said outside wall having upper and lower ends, a receptacle wall coupled between said upper ends of said inside and outside walls for receiving and supporting a cover, said outside wall having alternate inner and outer wall sections spaced from each other, said outer wall sections having intermediate ends located between said upper and lower ends of said outside wall, said inner wall sections having upper ends located below and next to said receptacle wall for supporting said receptacle wall, and support wall sections coupled to said intermediate wall ends of said outside wall and to said upper ends of said inner wall sections of said outside wall for providing support for said receptacle wall.

2. The apparatus of claim 1, comprising:

a flange coupled to and surrounding said outside wall between said upper and lower ends of said outside wall, said flange having an upper flange wall coupled to said outside wall and a lower flange wall spaced from said upper flange wall and coupled to said intermediate ends of said outer wall sections and to said support wall sections.

3. The apparatus of claim 2, wherein:

said outside wall comprises side wall sections coupled to said inner and outer wall sections and to said support wall sections, said outside wall above said flange being a smooth continuous wall extending around said inside wall.

4. The apparatus of claim 2, wherein:

said inside and outside walls, said support wall sections and said receptacle wall are formed of plastic material.

* * * * *